Patented Dec. 15, 1925.

1,565,812

UNITED STATES PATENT OFFICE.

HERMANN OEHME, OF KALK, NEAR COLOGNE, GERMANY, ASSIGNOR TO CHEMISCHE FABRIK KALK GES. MIT BESCHRÄNKTER HAFTUNG, OF COLOGNE-ON-THE-RHINE, GERMANY.

PROCESS FOR THE VULCANIZATION OF CAOUTCHOUC.

No Drawing. Application filed July 13, 1925. Serial No. 43,402.

*To all whom it may concern:*

Be it known that I, HERMANN OEHME, citizen of the German Republic, residing at Kalk, near Cologne-on-the-Rhine, Germany, have invented certain new and useful Improvements in a Process for the Vulcanization of Caoutchouc, of which the following is a specification.

It is well known to employ metallic oxides and preferably zinc oxide with or without the addition of organic accelerators for the combination of sulphur with the caoutchouc substance.

The different kinds of zinc oxide applied in the art of caoutchouc vulcanization are made by the oxidation of zinc vapours at a high temperature with air or steam. I have found that zinc hydroxide and the oxyhydrates of zinc are more effective and far superior to the zinc oxide made by a pyrogenous method as regards the vulcanization of caoutchouc.

Zinc hydroxide is usually made by precipitating zinc salts by bases. There are also other methods of preparing zinc hydroxide and oxyhrates, for instance, by the decomposition of zinc double salts by bases. All those processes are carried out in the presence of water at common or elevated temperatures, anyhow at far lower temperatures than those employed in the pyrogenous preparation of zinc oxide.

Experiments have shown, that I can prepare by a wet method either pure zinc hydroxide ($Zn(OH)_2$) or the so-called oxyhydrates of zinc of a variable composition:

$1ZnO.0.1H_2O$
$1ZnO.1.21H_2O$
$1ZnO.1.85H_2O$

The percentage of ZnO varies in those compounds from 97.4 to 71%.

On the other hand I can prepare zinc hydroxide ($Zn(OH)_2$) by drying different hydratic compounds of zinc oxide. It is also possible to hydrate zinc oxide made by a pyrogenous method, the product obtained containing variable quantities of constitutional water.

I have now found, that zinc hydroxide or the oxyhydrates of zinc, prepared by a wet chemical method have a considerably greater power of promoting the combination of sulphur with the caoutchouc substance than the other kinds of zinc oxides made by a pyrogenous method.

Comparative experiments have shown that in the same kinds of caoutchouc mixtures the application of zinc hydroxide or zinc oxyhydrates instead of zinc oxide have the surprising effect, that the complete vulcanization of caoutchouc is effected in less than half the time or the quantity of zinc oxyhydrate can be reduced to one half of the quantity of zinc oxide with the same result. Furthermore the temperature of vulcanization can also be considerably reduced, zinc hydroxide exhibiting a far greater chemical activity than zinc oxide. The strength of caoutchouc mixtures is increased by the application of zinc hydroxide in the vulcanization.

I am aware of Pearson having proposed to employ zinc oxide prepared by a wet process for coloring caoutchouc. Pearson describes two methods of preparing zinc oxide, viz a dry process consisting in the oxidation with air or a wet process consisting in the oxidation with steam. Both methods are, however, pyrogenous methods, the oxidation of zinc by air or steam proceeding at a red heat only. The zinc hydroxide and the oxyhydrates of zinc are not suitable for coloring caoutchouc possessing practically no power of colorization.

What I claim is:—

1. A process for the vulcanization of caoutchouc consisting in using zinc hydroxide for the combination of sulphur with the caoutchouc substance.

2. A process for the vulcanization of caoutchouc consisting in using oxyhydrates of zinc for the combination of sulphur with the caoutchouc substance.

In testimony whereof I affix my signature.

HERMANN OEHME.